United States Patent
Gill et al.

(10) Patent No.: US 6,544,431 B2
(45) Date of Patent: Apr. 8, 2003

(54) THIN FILM LITHIUM NIOBATE STRUCTURE AND METHOD OF MAKING THE SAME

(75) Inventors: Douglas M. Gill, Hoboken, NJ (US); Dale Conrad Jacobson, Allamuchy, NJ (US)

(73) Assignee: TriQuint Technology Holding Co., Hillsboro, OR (US)

(*) Notice: Subject to any disclaimer, the term of this patent is extended or adjusted under 35 U.S.C. 154(b) by 152 days.

(21) Appl. No.: 09/761,135

(22) Filed: Jan. 16, 2001

(65) Prior Publication Data

US 2002/0092823 A1 Jul. 18, 2002

(51) Int. Cl.[7] .............................. B44C 1/22; C03C 15/00; C03C 25/68; C23F 1/00
(52) U.S. Cl. .................... 216/87; 438/406; 438/407; 438/458; 117/3; 117/4; 117/915; 216/62; 216/24
(58) Field of Search .............................. 216/24, 36, 55, 216/87, 100, 108, 109, 62; 117/3; 438/406, 407, 459, 705

(56) References Cited

U.S. PATENT DOCUMENTS

| | | | |
|---|---|---|---|
| 4,978,418 A | 12/1990 | Arnold, Jr. et al. | |
| 5,194,117 A | * 3/1993 | Bindell et al. | 216/101 |
| 5,209,917 A | 5/1993 | Ohno et al. | |
| 5,315,432 A | 5/1994 | Ohno | |
| 5,512,383 A | 4/1996 | Chikuma et al. | |
| 5,763,055 A | 6/1998 | Kawaguchi et al. | |
| 6,120,597 A | * 9/2000 | Levy et al. | 117/33 |
| 6,172,791 B1 | * 1/2001 | Gill et al. | 359/245 |

OTHER PUBLICATIONS

M. Levy and R.M. Osgood, Jr. "Fabrication of single–crystal lithium niobate films by crystal ion slicing" Applied Physics Letters vol. 73. No. 16. Oct. 19, 1998.*

P. Rejmankova, J. Baruchel, P. Moretti, "Investigation of hydrogen implanted $LiNb_{O3}$ crystals under DC electric field by synchroton radiation topography" Physica B 226 (1996) 293–303.

* cited by examiner

*Primary Examiner*—Gregory Mills
*Assistant Examiner*—Roberts P. Culbert
(74) *Attorney, Agent, or Firm*—Wendy W. Koba

(57) ABSTRACT

A method of forming thin film waveguide regions in lithium niobate uses an ion implant process to create an etch stop at a predetermined distance below the lithium niobate surface. Subsequent to the ion implantation, a heat treatment process is used to modify the etch rate of the implanted layer to be in the range of about 20 times slower than the bulk lithium niobate material. A conventional etch process (such as a wet chemical etch) can then be used to remove the virgin substrate material and will naturally stop when the implanted material is reached. By driving the ions only a shallow distance into the substrate, a backside etch can be used to remove most of the lithium niobate material and thus form an extremely thin film waveguide that is defined by the depth of the ion implant. Other structural features (e.g., ridge waveguides) may also be formed using this method.

6 Claims, 3 Drawing Sheets

THIN FILM LITHIUM NIOBATE STRUCTURE AND METHOD OF MAKING THE SAME

TECHNICAL FIELD

The present invention relates to a thin film lithium niobate structure and, more particularly, to using an ion implanted etch stop to form a film of virtually any desired thickness with excellent uniformity.

BACKGROUND OF THE INVENTION

Lithium niobate ($LiNbO_3$) and other ferroelectric materials are often used as waveguiding layers in various optical devices such as, for example, optical switches, electro-optic modulators and the like. In these applications, it is particularly advantageous to be able to form relatively thin (i.e., <1 $\mu m$) layers of such films, due to their large optical confinement properties and strong optical nonlinearities.

Many techniques have been used in the past to form thin ferroelectric oxide films. In most cases, for example with $LiNbO_3$, a liquid phase epitaxy (LPE) process is used. In an exemplary LPE method, $Li_2O$—$V_2O_5$ is used as an LPE growing flux, and the raw materials are weighed and mixed in such a way that the melt composition becomes $LiNbO_3$:$Li_{0.7}Na_{0.3}VO_3$=20:80 (mol %), and the mixture, placed in a platinum crucible, is set in a furnace. The mixture is melted at 1000° to 1100° C. to have an even composition, and is then over-cooled to or below a saturating temperature. Next, a suitable substrate (such as $LiTaO_3$), attached to a platinum substrate holder with the +z face of the substrate facing downward, is inserted in the furnace and is sufficiently preheated on the flux. The resultant structure is then isothermally grown by, for example, a one-side dipping system. In one conventional arrangement, the growing temperature is between 930° and 950° C., the number of rotations of the substrate at the time of growth is 10 to 100 rpm, and the growing speed is about 1.0 $\mu m$ per minute.

Although this method is suitable for forming waveguiding structures in lithium niobate, the quality of the material in the waveguide-formed region is often less than desirable. In a best case, it would be preferred to fabricate a thin film of lithium niobate from a bulk grown $LiNbO_3$ substrate, since bulk grown $LiNbO_3$ is of much higher quality than materials previously used, thus improving the quality of the grown film.

Thus, a need remains in the art for a method of providing high quality, thin film lithium niobate structures.

SUMMARY OF THE INVENTION

The need remaining in the prior art is addressed by the present invention, which relates to a thin film lithium niobate structure and, more particularly, to using an ion implanted etch stop to form a film of virtually any desired thickness (e.g., $\leq 15$ $\mu m$).

In accordance with the present invention, a single crystal bulk lithium niobate substrate is subjected to ion bombardment so as to create a "damaged" layer at a predetermined distance below the substrate surface. The implant energy determines the depth of this damaged layer below the surface. Following the ion implant, a heat treatment process is performed, where the heat treatment serves the dual purpose of "healing" some of the damage in the lithium niobate material between the damaged layer and the surface, and modifies the etch rate of the damaged layer. Hereinafter, the "damaged layer" will be referred to as the "etch stop layer". Subsequent to the heat treatment process, the etch properties of the lithium niobate bulk material and etch stop layer are sufficiently different that a conventional wet chemical etch may be used to form the desired thin film lithium niobate structure.

In one embodiment of the present invention, the ion implant process is performed to yield an etch stop layer at a relatively shallow depth (e.g., 2 $\mu m$) below the substrate surface. Subsequent to the heattreatment step, the substrate is bonded to a "handle" wafer, where the substrate surface that had been subjected to the ion bombardment is bonded to the handle wafer (i.e., the substrate is turned "upside down" and bonded to the handle wafer). The exposed bulk of the lithium niobate substrate is then removed by a conventional wet chemical etch and will stop, in accordance with the present invention, at the etch stop layer created by ion bombardment. The remaining lithium niobate material, therefore, will be the relatively thin, 2 $\mu m$ top surface region of the original substrate. Therefore, in accordance with the present invention, a thin lithium niobate film is formed from the original bulk substrate material.

In another embodiment, a ridge waveguide structure (or any other patterned structure) may be formed by first masking the surface of the lithium niobate bulk crystal substrate prior to the ion implantation. As before, a heat treatment process is used to modify the etch rate characteristics of the ion implanted regions with respect to the remaining substrate material. A following wet chemical etch will then preferentially remove the original lithium niobate substrate material with respect to the ion bombarded layer.

Various and other embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
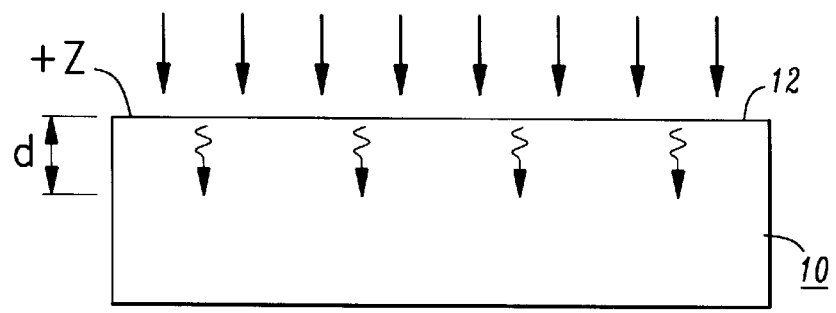
FIGS. 1-4 illustrate an exemplary process of forming a thin film lithium niobate layer using an ion implanted etch stop in accordance with the present invention.

The following describes, in more precise terms, the formation of an "etch stop" in a lithium niobate single crystal substrate, as well as the utilization of such an etch stop in the formation of various optoelectronic device structures. Referring now to FIG. 1, an exemplary lithium niobate substrate 10 is shown, where the single crystalline material is oriented such that its +z crystal face is positioned as top surface 12 of substrate 10. In accordance with the present invention, an etch stop layer is formed within substrate 10 by bombarding top surface 12 of substrate 10 with an ion source, designated by the set of arrows in FIG. 1. The ions accelerating and striking surface 12 will penetrate a predetermined depth d into substrate 10, where depth d is a function of the implant energy. For example, an implant energy of 3.6 MeV with oxygen ions has been found to produce an implant layer approximately 2 $\mu m$ below surface 12 of substrate 10.

Figure 2:
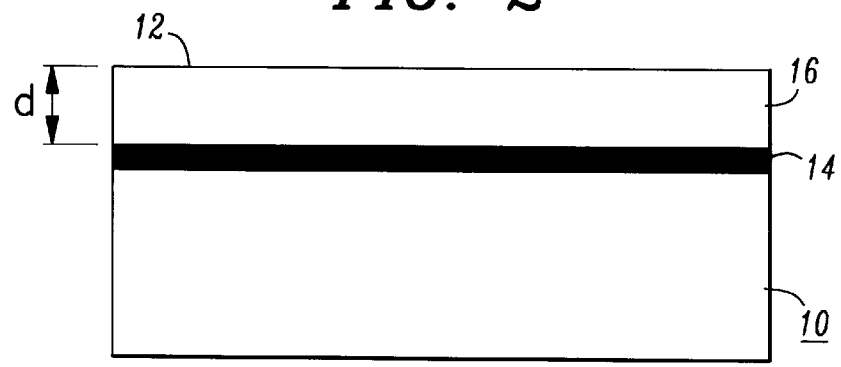

FIG. 2 shows lithium niobate substrate 10 subsequent to the ion implant process, producing a "damaged layer" 14 at the predetermined depth d. In accordance with the process of the present invention, the structure is then heated to a temperature sufficient to anneal out a portion of the crystallographic structure damage imparted to region 16 of substrate 10 during the ion implant process. It has been found that such a heat treatment is also necessary to modify the etch rate of layer 14; without a heat treatment, layer 14 will actually etch faster than the virgin substrate material. For example, raising the temperature of substrate 10 briefly to approximately 400° C., then returning to room temperature, has been found to create an etch rate in the ion implant layer that is 10 to 20 times slower than the remaining, non-implanted lithium niobate substrate.

Figure 3:
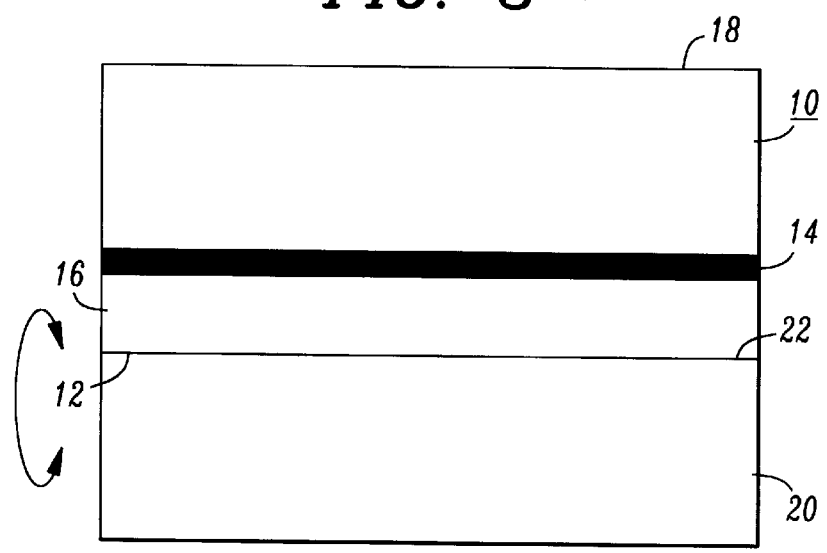

As mentioned above, the creation of such an etch stop in lithium niobate is useful in forming a thin film lithium niobate waveguide, where the "thickness" of the thin film layer is controlled by controlling the ion implant depth. The next step in the process of forming a thin film lithium niobate waveguide in accordance with the present invention is illustrated in FIG. 3. In particular, subsequent to the heat treatment step, the structure as shown in FIG. 2 is bonded to a "handle" wafer substrate 20 (comprising a material such as MgO, sapphire, or $SiO_2$-coated Si), where the +z crystal face surface 12 of substrate 10 is bonded to top surface 22 of handle substrate 20. Substrate 20 is referred to as a "handle" wafer simply because it is used as a mechanical means of holding substrate 10 in place during subsequent processing steps. As shown in FIG. 3, this "top side" bonding of surface 12 of substrate 10 to substrate 20 results in turning substrate 10 "upside down" and exposing bottom major surface 18 of substrate 10 for further processing.

Figure 4:
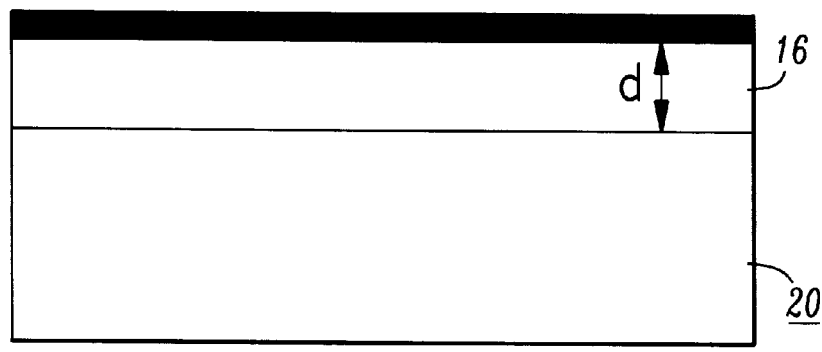

The structure of FIG. 3 is then etched (or, alternatively polished using any well-known chemical or mechanical process), starting at exposed surface 18, until etch stop layer 14 is reached, where the above-described characteristics of layer 14 (i.e., an etch rate 10 to 20 times slower than the bulk $LiNbO_3$ material) will serve as an end point indicator for the etch process. The resultant structure, illustrated in FIG. 4, will then comprise a relatively thin $LiNbO_3$ film 16 of the desired depth d. One exemplary etch that may be used in the process of the present invention is a wet chemical etch. It is well known that the rate at which $LiNbO_3$ can be wet etched is strongly dependent on its crystal orientation. For example, it has been shown that the −z crystal face of $LiNbO_3$ etches much faster than the +z crystal face, in an etchant of $HNO_3$:HF (2:1 mixture). In addition, it is known that an etch rate can be very dependent on material composition. Therefore, the wet etch characteristics of $LiNbO_3$ in conjunction with the ability to produce compositional and structural changes within a $LiNbO_3$ implant layer combine to produce physical attributes capable of providing an etch stop within the $LiNbO_3$. While the wet chemical etch using $HNO_3$:HF is preferred, it is to be understood that other etchants, such as HF or RCA1, may also be used in process of the present invention.

Figure 5:
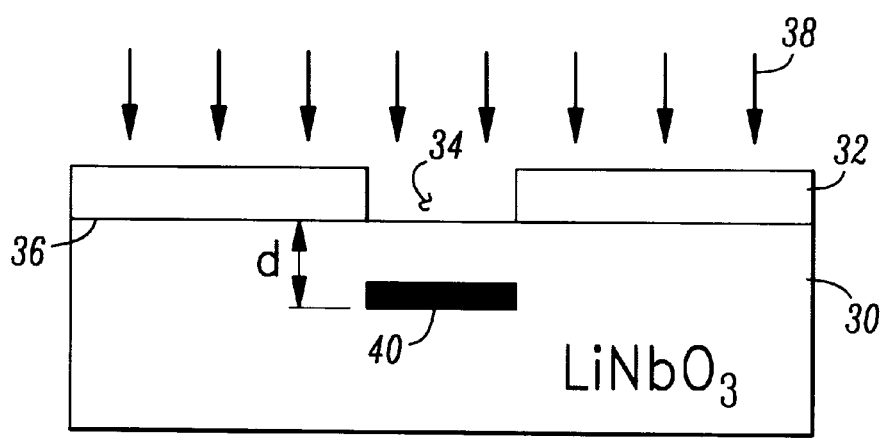
FIGS. 5-7 illustrate an alternative process of forming a predetermined lithium niobate structure using the ion implanted etch stop process of the present invention.

As mentioned above, the formation of an etch stop in $LiNbO_3$ can also be used to fabricate a desired surface structure or feature in the bulk $LiNbO_3$. In particular, the process of the present invention may be used to form a trough along the surface of a $LiNbO_3$ substrate, the trough then used as a delineation between adjacent waveguides in the material. FIG. 5 illustrates the starting arrangement for such a process of forming adjacent waveguides in a lithium niobate substrate. As shown, a $LiNbO_3$ substrate 30 is first covered with a masking layer 32 that includes an opening 34 in the area where it is desired to remove the lithium niobate. Masking layer 32 (which may comprise, for example, Ni, Cr, Au or $SiO_2$) is disposed to cover the −z crystal face surface 36 of substrate 30 so that this surface will be easily etched during processing. Once masking layer 32 is in place, an ion implant process is performed (designated by arrows 38 in FIG. 5), using an energy appropriate to drive the ions to the desired depth d below surface 36. In this case, an implant region 40 is formed as shown in FIG. 5. Again, a heat treatment (at 400° C., for example) is performed at the end of the implant, used to modify the etch rate of implant region 40 and facilitate its use as an etch stop.

Figure 6:
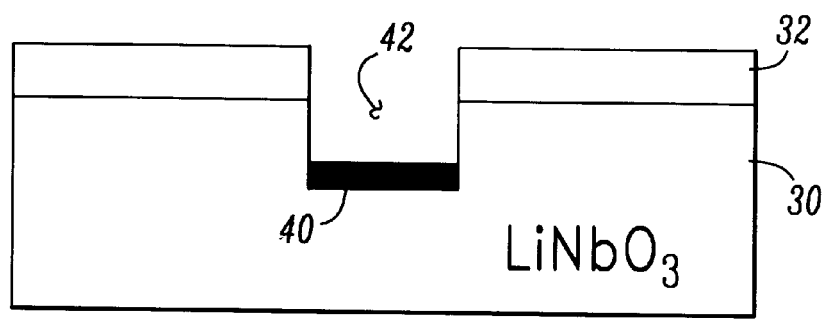
Figure 7:
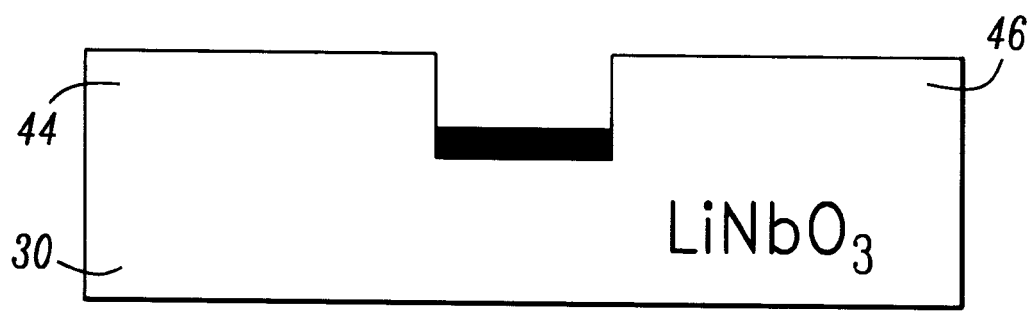

With masking layer 32 still in place, an etching process is used to remove the exposed portion of $LiNbO_3$ substrate material 30 in area 42. As before, a wet chemical etch has been found to be preferred for this process, yielding a structure as shown in FIG. 6. Once the etching is completed, masking layer 32 is removed, forming a final structure as shown in FIG. 7. In this particular structure, the implant etch stop 40 allows the formation of a pair of ridge waveguides 44 and 46 in the bulk lithium niobate material. As mentioned above, the ability to form waveguide structures in the bulk single crystal material (in contrast to the prior art processes of forming LPE grown waveguides) yields optical paths of significantly improved quality.

Figure 8:
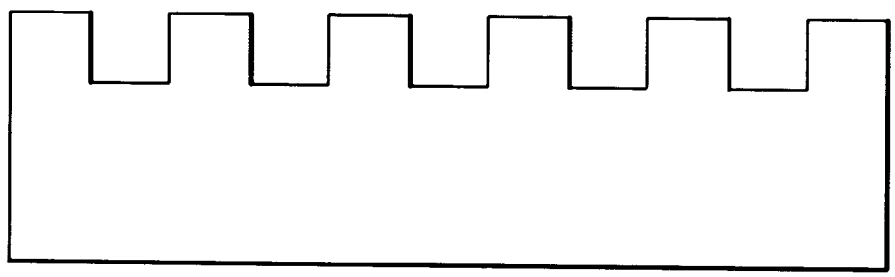
FIG. 8 illustrates an alternative structure, including a plurality of waveguides, formed in accordance with the present invention.

The process of the present invention may be used to form a variety of structures, where by controlling the energy of the implant process, it can be used to form thin film waveguides of any desired thickness. Indeed, the use of multiple masking layers and implant energies canbe combined to form a device including waveguides of different thicknesses. Additionally, as a modification of the process described above in association with FIGS. 5-7, the masking layer used can easily be modified to form a waveguide array structure (i.e., modify the mask to include a plurality of openings), as illustrated in FIG. 8.

In general, the ion implant etch stop process described above may be used to form any desired arrangement in a lithium niobate substrate. The examples described above are considered to be merely illustrative of the process and are not intended to limit the spirit and scope of the present invention, as defined by the claims appended hereto.

What is claimed is:

1. A method of etching a lithium niobate substrate to form a thin lithium niobate film waveguide along a surface of said substrate, the method comprising the steps of:

a) providing a lithium niobate substrate, oriented to expose as a top surface a crystal face with a preferential etch rate, the substrate also defined as comprising a parallel bottom surface of the opposite crystal face;

b) performing an ion implant process through said substrate top surface, using an energy sufficient to drive the ions a predetermined depth d into said substrate;

c) heating the ion implanted substrate to a predetermined temperature, then returning to room temperature, the heated ion implant region forming an etch stop;

d) bonding the exposed top surface of said substrate to a support substrate;

e) orienting the bonded structure to expose the bottom surface of said substrate to an etchant; and f) etching said exposed bottom surface to remove all substrate material until reaching the etch stop created in step c).

2. The method as defined in claim 1 wherein in performing step a), the +z crystal face of the substrate is exposed as the top surface.

3. The method as defined in claim 1 wherein in performing step c), the substrate is heated to a temperature of approximately 400° C.

4. The method as defined in claim 1 wherein in performing step d) a wet chemical etch is used.

5. The method as defined in claim 4 wherein the wet chemical etchant comprises $HNO_3$:HF in a 2:1 mixture.

6. The method as defined in claim 1 wherein in performing step b) an energy of approximately 3.6 MeV is used with oxygen ions, forming an ion implant etch stop layer approximately two microns below the exposed top surface of the lithium niobate substrate.

* * * * *